UNITED STATES PATENT OFFICE.

OWEN R. JONES, OF WILLIAMSBURG, IOWA.

VETERINARY REMEDY.

SPECIFICATION forming part of Letters Patent No. 359,611, dated March 22, 1887.

Application filed October 18, 1886. Serial No. 216,542. (No specimens.)

*To all whom it may concern:*

Be it known that I, OWEN R. JONES, a citizen of the United States, residing at Williamsburg, in the county of Iowa and State of Iowa, have invented a new and useful Composition of Matter to be Used for the Healing of Cuts, Bruises, and Sores of Domestic Animals, of which the following is a specification.

My composition consists of the following ingredients, combined in the proportions stated: pure water, one and one-half gallon; smartweed (*Polygonum punctatum* or *hydropiper*) tops, one pound; burdock (*Lappa major*) tops, one pound; milkweed (*Asclepias synaca*) tops, one-half pound; marsh-mallow (*Malva rotundifolia*) root and tops, one-half pound; plantain (*Plantago Americanum*) tops, one-fourth pound; lamb's-quarter (*Chenopodium album*) tops, one-fourth pound; Spanish needles (*Bidens bipinnati*) tops, one-eighth pound; alcohol, one pint; kerosene-oil, one pint; dried and powdered clay, three and one-half pounds.

The foregoing herbs are to be gathered when green and placed in one and one-half gallon of pure water and steeped over a slow fire until but one (1) gallon of liquid remains, when the liquid is strained off and allowed to cool. A pint of alcohol is then added to the liquid. The clay is washed, dried, and powdered and added to the liquid, together with a pint of kerosene-oil, the ingredients to be thoroughly mingled by agitation.

The above composition is to be applied externally for the healing of cuts, bruises, and sores of domestic animals as follows: Cleanse the affected part of animal from dirt, filth, or blood with water but slightly warmed, and apply the composition thereto with a light brush or feather, giving the part affected a thorough coating. If there is no abrasion of the skin, rub the part gently to facilitate absorption of the composition. Repeat the application as needed until the part is healed. By thus applying the above composition inflammation and swelling are allayed and open wounds and sores rapidly closed and healed.

What I claim, and desire to secure by Letters Patent of the United States, is—

The herein-described composition of matter to be used for the healing of cuts, bruises, and sores of domestic animals by external application, and consisting of water, smartweed, burdock, milk-weed, marsh-mallow, plantain, lamb's-quarter, Spanish needles, alcohol, kerosene-oil, and dried and powdered clay, in proportions specified.

OWEN R. JONES.

Witnesses:
BENJAMIN HARRIS,
RICHARD W. THOMAS.